May 31, 1932.   A. J. AMES   1,860,376
TURNING TOOL FOR WOOD TURNING LATHES
Filed June 12, 1930
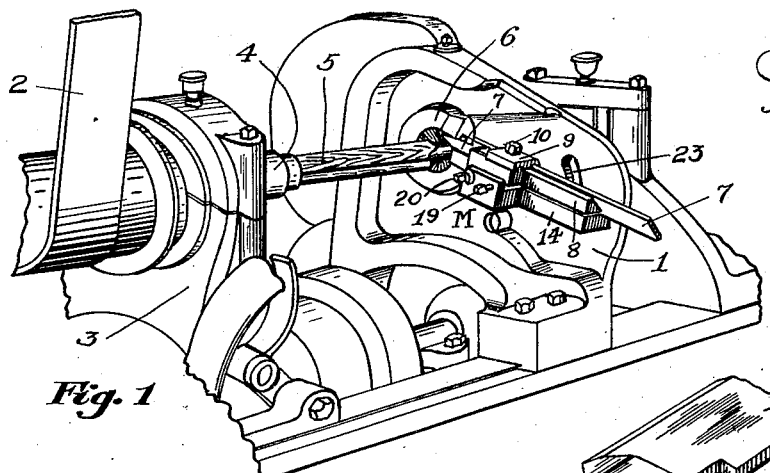
Fig. 1
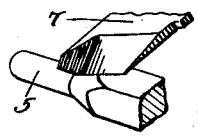
Fig. 8
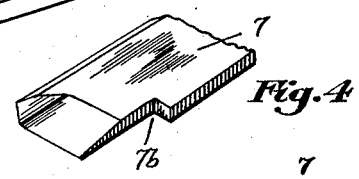
Fig. 4
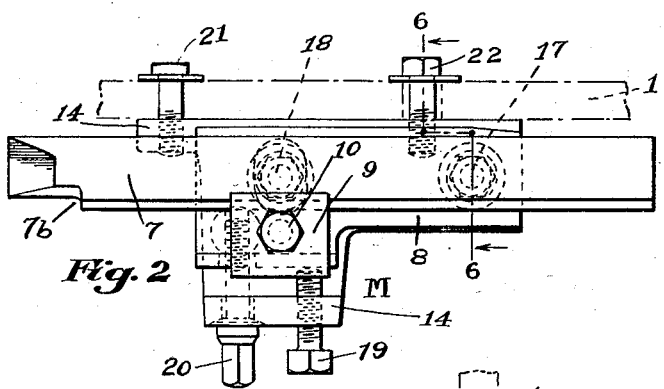
Fig. 2
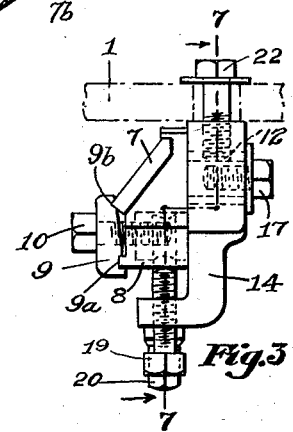
Fig. 3
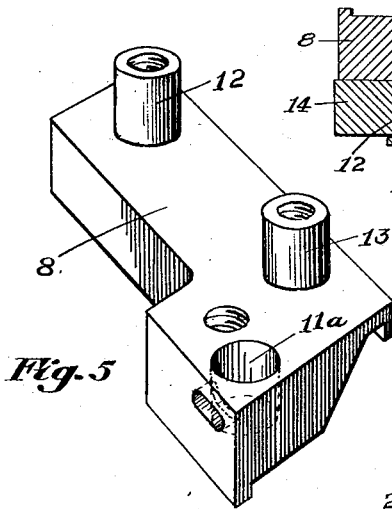
Fig. 5
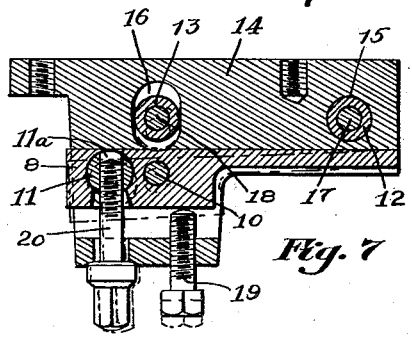
Fig. 6
Fig. 7
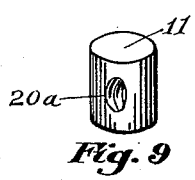
Fig. 9
INVENTOR.
Alton J. Ames.
BY Nicolous Harithos
Attorney.

Patented May 31, 1932

1,860,376

UNITED STATES PATENT OFFICE

ALTON J. AMES, OF WOODSTOCK, MAINE

TURNING TOOL FOR WOOD TURNING LATHES

Application filed June 12, 1930. Serial No. 460,780.

My invention relates to an improvement in a turning tool and its support for wood turning lathes, and the objects of my improvement are to provide a turning tool that cuts smoother, is attached to the lathe more securely, is more easily adjusted, lasts longer, and does work more satisfactorily.

The character of the invention may best be understood by reference to the description found in the following specification, when taken in connection with the accompanying drawings in which—

Fig. 1 is a perspective view of my turning tool mounted on a wood-turning lathe, a portion only of the latter being shown;

Fig. 2 is a plan view of the tool;

Fig. 3 is an end view of the same;

Fig. 4 is a fragmentary perspective view of the tool, the cutting end only being illustrated;

Fig. 5 is a perspective of the tool-carrying block, the same being inverted to show the bottom side;

Fig. 6 is a sectional elevation taken on broken line 6—6, Fig. 2 with the cutting tool omitted;

Fig. 7 is a sectional plan view taken on broken line 7—7, Fig. 3;

Fig. 8 is a view representing the position the cutting tool assumes, on and with respect to the "square", when turning the latter; and Fig. 9 is a perspective view of the revoluble nut operable with one of the adjusting screws for the tool-carrying block.

Similar reference characters are employed to identify like parts in all the different views of the drawings.

Referring to Fig. 1 of the drawings, 1 represents a portion of the wood-turning lathe to which the turning-tool is secured, 2 the power belt, 3 the headstock of the wood-turning lathe, 4 the chuck threaded onto the arbor, which arbor is a part of the headstock, 5 the stick of lumber held in place by the revolving chuck on one end and on the other end by the ring 6; the other parts of the wood-turning lathe in Fig. 1, are not numbered, because they have no bearing in the description of this invention.

Supported on the wood-turning lathe is the tool carriage and turning-tool designated in its entirety by the character M, and in which 7 represents the cutting-tool, or as it is commonly called the roughing knife, as disclosed in Figures 2, 4, and 8. The cutting-tool differs from the cutting-tools of the prior art in that the bevels of its cutting edge are disposed on its upper side, as shown in Fig. 8, and this eliminates friction caused by the cutting action and preserves the sharpness of the cutting edge. The second feature of my cutting-tool is that it is made slightly wider to allow a portion to be cut away as at 7b leaving a shoulder by which endwise adjustment of the cutting-tool can be had with a hammer.

The cutting-tool 7 is made to slide for adjustment in the tool-carrying block 8, held in place by tool-cap 9, and the tool-cap is secured to the tool-carrying block by the cap-screw 10 as disclosed in Fig. 3. In order to hold the cutting-tool most securely the tool-cap is made with a groove 9a on one side which fits over the tongue of the tool-carrying block, and on the other side with a groove 9b that fits over the cutting-tool. This is done to hold the cutting-tool tighter.

In the tool-carrying block 8, there is found the socket 11a in which operates the revoluble nut 11, and the two studs 12 and 13, all as disclosed in Fig. 5 of the drawings. Stud 12 is made to fit in the round hole 15 of the tool base 14, and its purpose is to secure the tool base to the tool-carrying block, and to act as a pivot for adjustment of the block with respect to base. Stud 13 is made to fit in slot 16 in the base 14 so that play can be had for adjustment, and it works in conjunction with set screw 19 and special collar screw 20. Set screw 19 works in conjunction with special collar screw 20 to hold tool-carrying block in place and adjust the same laterally by loosening one screw and tightening the other. The studs 12 and 13 are made with tapped holes for the reception of cap screws 17 and 18, to secure the tool base to the tool-carrying block. The special collar screw 20 has screw-threaded engagement with the revoluble nut 11 at 20a, and the object of this combination is to hold the tool base and the tool-carry block more securely, and at the same time to bring correct adjustment of the tool-carrying block for setting the cutting-tool in position to do the work, and further to bring proper alignment between special collar screw 20 and revoluble nut 11 when adjustments are made of the tool-carrying block. The tool base is pivotally secured to the wood-turning lathe by screw 21 and vertical adjustment of the tool-carrying block is effective by means of the screw 22 operating in the slot 23 in the portion 1 of the wood-turning lathe.

Having thus described and explained my invention, what I claim as new and desire Letters Patent is:

A tool-holder for turning-tools for use on wood-turning lathes, having a transverse member thereon, comprising in combination, a tool-base adapted to be secured to said transverse member in various positions, said tool-base being pivotally secured at one end and vertically adjustable at the other end, a tool-carrying block mounted on said tool-base, and being pivotally secured at one end and adjustably secured at the other end by means of studs and screws, a revoluble nut in said tool-carrying block, a collar screw passing through said base and engaging said revoluble nut whereby lateral adjustment of said tool-carrying block on and with respect to said tool-base may be had, said collar screw working in conjunction with a set screw, a tongue formed on the outer edge on the top of the tool-carrying block, a tool-cap with a groove fitting over the tongue of the tool-carrying block to hold tool-cap in place, and a tool-cap screw.

In testimony that I claim the foregoing, I have hereunto set my hand this 12th day of May, A. D. one thousand nine hundred and thirty.

ALTON J. AMES.